United States Patent
Hansen et al.

(10) Patent No.: US 9,927,271 B2
(45) Date of Patent: Mar. 27, 2018

(54) SYSTEM FOR IDENTIFYING A SENSOR AND MEASURING FLOW IN A FLOW DUCT

(71) Applicant: LINDAB AB, Bastad (SE)

(72) Inventors: Henning Max Hansen, Sønderborg (DK); Hans Schmidt-Hansen, Haderslev (DK)

(73) Assignee: LINDAB AB, Bastad (SE)

( * ) Notice: Subject to any disclaimer, the term of this patent is extended or adjusted under 35 U.S.C. 154(b) by 0 days.

(21) Appl. No.: 14/900,306

(22) PCT Filed: Jun. 13, 2014

(86) PCT No.: PCT/DK2014/050165
§ 371 (c)(1),
(2) Date: Dec. 21, 2015

(87) PCT Pub. No.: WO2014/202084
PCT Pub. Date: Dec. 24, 2014

(65) Prior Publication Data
US 2016/0377467 A1    Dec. 29, 2016

(30) Foreign Application Priority Data
Jun. 21, 2013 (DK) ................................ 2013 70341

(51) Int. Cl.
*G01F 1/66* (2006.01)
*G01F 15/06* (2006.01)
(52) U.S. Cl.
CPC .............. *G01F 1/662* (2013.01); *G01F 1/66* (2013.01); *G01F 1/667* (2013.01); *G01F 15/061* (2013.01); *G01F 15/066* (2013.01)

(58) Field of Classification Search
CPC ....................................................... G01F 1/662
See application file for complete search history.

(56) References Cited

U.S. PATENT DOCUMENTS

| 5,282,388 A | 2/1994 | Czajkowski |
| 5,514,958 A | 5/1996 | Germer |

(Continued)

FOREIGN PATENT DOCUMENTS

| JP | 2006-003085 A | 1/2006 |
| WO | 93/00569 A1 | 1/1993 |

(Continued)

*Primary Examiner* — Robert R Raevis
(74) *Attorney, Agent, or Firm* — David S. Safran

(57) ABSTRACT

A system or a method for measuring flow of fluid or gas, has a flow duct with at least two transducers which generate at least one beam of ultrasound in the flow duct in which ultrasound transducers are placed in a fixed positions in a duct for flowing air where the electronic device for analyzing signal from the transducers is performed in a handheld device. A transmitter circuit is permanently connected to the transducers and a receiver circuit is placed in a handheld device. The transmitter circuit has calibration data representing the actual placement of the transducers in relation to the actual duct, which calibration data is communicated by every connection to the receiver circuit. Hereby can be achieved that transducers can be permanently placed in ventilation ducts in buildings, where placement of ultrasound transducers for measurement and for calibration of measurement of an air stream is nearly impossible.

9 Claims, 3 Drawing Sheets

(56) References Cited

U.S. PATENT DOCUMENTS

| | | | |
|---|---|---|---|
| 6,244,114 B1 | 6/2001 | Kowal et al. | |
| 2005/0228298 A1* | 10/2005 | Banet | A61B 5/0205 600/485 |
| 2008/0216555 A1 | 9/2008 | Funck et al. | |
| 2009/0007625 A1* | 1/2009 | Ao | G01F 25/0007 73/1.31 |
| 2012/0245878 A1 | 9/2012 | Kane et al. | |
| 2015/0127275 A1* | 5/2015 | Hies | G01F 25/0007 702/48 |

FOREIGN PATENT DOCUMENTS

| | | |
|---|---|---|
| WO | 2006/098835 A1 | 9/2006 |
| WO | 2009/071960 A1 | 6/2009 |
| WO | 2010/122117 A1 | 10/2010 |

\* cited by examiner

SYSTEM FOR IDENTIFYING A SENSOR AND MEASURING FLOW IN A FLOW DUCT

BACKGROUND OF THE INVENTION

Field of the Invention

The present invention relates to a system or a method for measuring flow of fluid or gas, which system comprises a flow duct, which flow duct comprises at least two transducers, which transducers generate at least one beam of ultrasound in the flow duct.

Description of Related Art

Unpublished Danish patent application PA 2012 70241 filed by the same applicant disclose a system or a method for measuring flow in a flow duct, comprising at least two ultra sound transducers. It is the object of this application to measure the flow of air in a duct by one or more transducers transmitting beams of ultra sound controlled by a microcontroller based electronic system. The object can be achieved if the microcontroller stores a vector of data samples for each direction of transmission, which vector comprises an appropriate number of N samples forming a frame, which microcontroller multiply each value of the frame which a complex number, which microcontroller based on the result calculates the flow in the duct. By the invention according to the present patent application an efficient flow measurement of air flowing in a duct can be achieved.

SUMMARY OF THE INVENTION

The object of the present application is to place ultrasound transducers in a fixed position in a duct for flowing air where the electronic device for analyzing signals from the transducers is placed in a handheld device.

A further object of the present patent application is to achieve automatic calibration and adjustment of the handheld device depending on the dimensions of the measuring duct.

The objects can be achieved by a system as described herein in which transducers are mounted and fixed in relation to the duct, in which a transmitter circuit is permanently connected to the transducers, in which a receiver circuit is placed in a handheld device, which handheld device communicates with the transmitter circuit, in which the transmitter circuit comprises calibration data representing the actual placement of the transducers in relation to the actual duct, and in which the calibration data is communicated by every connection to the receiver circuit placed in the handheld device.

Hereby can be achieved that transducers can be permanently placed in ventilation ducts in buildings, where later placement of ultrasound transducers for measurement and for calibration of measurement of an air stream is nearly impossible. But, realizing that the price of the transducers is relative low compared to the price of measuring electronics, the present application makes it possible that the relative cheap transducers are permanently mounted maybe where there is nearly no possibility to have access, and when it is necessary, the transducers can be activated by connection to the handheld device. In that way, it is possible to measure changes in the air stream, maybe because of pollution of dust or other contamination in air ducts, it is possible by time intervals to control the flow of air and cleaning of air ducts be performed dependent of measured values. It is rather important in larger buildings where air condition is a very important part of the comfort in buildings where thousands of inlets for fresh air can be places in different offices, it is very important a control of the air flow in different parts of a building can be performed not constantly, but after some time intervals for example, a few times a year. Placing ultrasound flow measuring systems thousands of places in a building will result in an enormously high cost. But in that situation, of course, it will be possible continuously to measure the air flow in the building. This continued measurement is of no value because the changes in air flow because of pollution in the ducts take place over longer periods. Therefore, it has a high value that relative cheap transducers are permanently placed everywhere it is necessary to measure the air stream, for example, in relation to every air outlet in a building.

In order to measure the air flow by means of at least a pair of transducers, the handheld electronic unit must know a calibration factor depending on the size of the duct and the distance between transducers. The calibration factor may be stored locally together with the transducers and transferred to the electronic unit by some means.

It is also possible to store other data, for example, the initial signal levels, the temperature calibration value, set points or other data convenient to have at hand when performing maintenance on the ventilation system.

Measured data and calibration information can be transmitted from the storing circuit to the receiver circuit by wireless transmission means. It is possible by wireless communication to reach the necessary information from the storing circuit commonly placed in the building where the transmitted information could be for example, the actual calibration value for the actual placement of the ultrasound flow measuring device and the actual signals that are received at the transducers. In that way all the electronic handling that is necessary for measuring the time difference in the ultrasound up- and downstream in the air duct can be performed in the handheld device.

At least calibration data can be communicated by RFID technology. It is possible that the calibration data are transmitted in its own way be the RFID technology. In that way near field communication is possible. If passive RFID technology is in use then the handheld device probably should be as close as a few centimeters from the RFID, in other situations where active RFID technology is used, probably also the measuring data could be transmitted by that technology, but in that situation, the RFID must have a data input and a power supply for the RFID is necessary.

At least calibration data can be transmitted by a magnetic resonance circuit. It is possible to perform connection of a handheld device by magnetic measurements. A high frequency of magnetic signals can be modulated with data so a relative large data amount can be transmitted by the magnetic resonance technology. Again, a near field communication is achieved and the distance between the handheld device and the transmitter circuit has to be reduced to a few centimeters.

Calibration data can be stored as a bar code at the transmitter circuit, which bar code dataset represent directly or indirectly the calibration data, which calibration data is read by the hand held device by transmission of data representing ate actual flow in the duct. It is possible by first installation of the ultrasound flow measuring device to print the calibration data or a reference to the calibration data on a bar code. This bar code can then be placed everywhere there is a surface that can be used near the transmitter circuit. Hereby can the handheld device by a traditional bar code scanner read the calibration information related to the actual ultrasound flow measuring device.

The transmitter circuit can be connected to a first part of a connector, which handheld device comprises a second part of the connector, which connector transmits at least the calibration data. By using a connector for getting access from the handheld device to the transmitter circuit, it is possible that the storing circuit is designed without any power supply when it is not in use. Therefore, the connector can in some situations start a power and at first then read the calibration data and hereafter start performing measurement.

The transmitter circuit can comprise at least one EEPROM, which EEPROM comprises at least a data segment representing the calibration data, which calibration data is transmitted from the EEPROM by the connector to the handheld device. It is possible in both wireless connection and by use of a connector to have the calibration data stored in an EEPROM. This EEPROM stores the calibration data highly effective and the data can be read in the EEPROM by most available processors in a serial way reducing the number of pins in the connector. It also possible that the EEPROM is connected to a small processor, which processor then communicates either wireless or through the connector with the handheld device.

The transmitter circuit comprises at least one DIL switch, which DIL switch comprises at least a data segment representing the calibration data, which calibration data is transmitted from the DIL switch by the connector to the handheld device. By activating or deactivating a number of switches placed on for example, a printed circuit board, it is possible in that way to store the data representing the calibration data. The calibration data can be stored directly or indirectly. Indirectly can only data representing the actual flow measuring device be stored in the combination of active or passive DIL switches. In that situation the actual calibration standard is placed in a data storage in the handheld device or in a at a base reachable by the handheld device.

The transmitter circuit can comprise a resistor, which resistor can have a resister value that represents the calibration data for the actual duct, which resister value is transmitted to the handheld device. One of the cheapest electronic components that can be used is a resistor. The resistor value can represent the calibration data. In that way only a measurement of the ohmic value has to be performed in the handheld device for finding the calibration data. In the size of resistors it should be possible to use values from maybe 10 ohms up to several mega ohms where these values can be measured highly effective and the way the value is stored is high reliable.

The resistance representing the calibration data can be stored in a potentiometer such as a rheostat. It is possible to adjust any potentiometer to a specific value and then simply let that potentiometer remain in that position. In that way it is possible to achieve the resistance that represents the actual calibration data.

The resistance representing the calibration data can be represented in a plurality of resistors, which resistors are activated by connecting one or more resistors for representing the calibration data. It is possible for example, on a printed board just to place a number of resistors to achieve a value that represents the calibration data. It should be possible during production to produce small printed boards with different ohmic values so these relative small printed boards could be placed for example, in a connector and then indicating the calibration standard.

The resistance can be generated at a printed board, at which printed board a number of selected resistors are serial connected, which resistors are short circuited by a conductor at the printed board, which conductor passes a pad, which pad is to be removed for activating the resistor. Placing a row of resistors in series, the existing resisting value will be the sum of the resistors. Shorting all resistors by pads that could be broken away can, in that way, activate each of the resistors which then are serial connected. In this way, it can be achieved that a great number of different calibration values can be activated simply by breaking away some pads from a small printed board. In real life, it is the different calibration data, maybe limited to a number of different sizes of air ducts. Because air ducts probably only are produced in some standard sizes, only a small number of calibration data are necessary.

In an alternative embodiment, the calibration data can be received by measurement of the transmission delay. Because the flow duct has standard sizes and selection of the correct size is possible by the transmission delay.

DETAILED DESCRIPTION OF THE INVENTION

Figure 1:
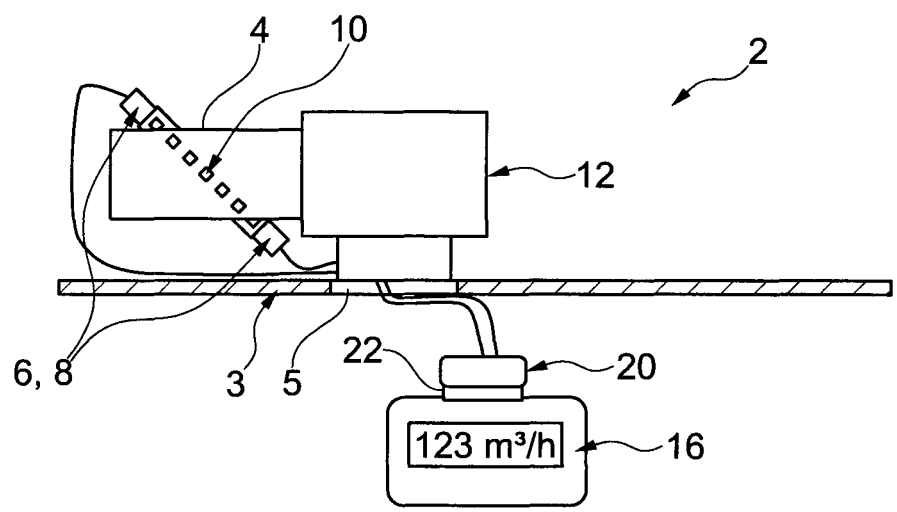
FIG. 1 shows a first possible embodiment for the invention where the system is in full operation.

FIG. 1 shows one first possible embodiment for the invention for a system 2. Most of the system is placed above a ceiling 3 where an air duct 4 and 5 is indicated. Ultrasound transducers 6, 8 are generating a beam of ultrasound across the duct 4. The signals from the ultrasound transducers 6, 8 are sent by wires to a first part of a connector 20, which connector has a further part 22, which connects the transducer circuit 6, 8 to the handheld device 16. At the handheld device 16 is indicated 123 cubic meters per hour which is an example of a measured value.

It is therefore possible to perform an effective measurement of the air streaming to the duct in a situation where there is no access directly to the transducers 6, 8 because they are placed above the ceiling. All necessary information is by wiring sent to the connector 20, which connects to the other part 22. Therefore, the signals from the transducers 6, 8 can be transmitted into the handheld device 16. The handheld device 16 comprises all the necessary electronics for measuring the time difference there is for the ultrasound beam 10 in a first direction following the flow and in a second direction against the flow of air. Based on the difference in the measured time it is possible if the system has the knowledge of the size of the duct 4 to calculate the airflow as indicated at the handheld device 16. In order to achieve a reliable result, it is necessary to perform a calibration of the handheld device 16 according to the size of the duct 4. It is therefore important that calibration data is available for the handheld device in order to achieve reliable measurement.

Figure 2:
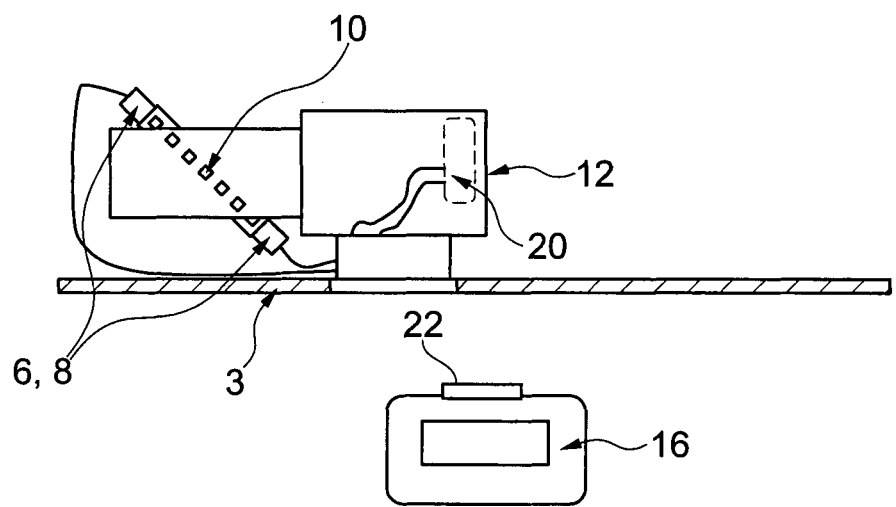
FIG. 2 shows the same system, but when the system is in a non-operational mode.

FIG. 2 shows the same embodiment as indicated at FIG. 1, but at FIG. 2 the connector 20 is disconnected and placed inside the transducer circuit 6, 8, which has a housing where there is room for the connector 20. In this situation, there can be no measurement and the whole system can be switched off because there is no need to have any ultrasound across the duct, because no measurement is performed. The handheld device 16 is also shut off because there is no connection to the connector 22. Hereby is achieved a highly energy effective system, because there is no power consumption in the system when the connector is not in the connected situation.

The transmitter circuit comprises at least one DIL switch 12, which DIL switch comprises at least a data segment representing the calibration data, which calibration data is transmitted from the DIL switch 12 by the connector 20 to the handheld device 16. By activating or deactivating a number of switches placed on for example, a printed circuit board, it is possible in that way to store the data representing the calibration data. The calibration data can be stored directly or indirectly. Indirectly can only data representing the actual flow measuring device be stored in the combination of active or passive DIL switches. In that situation the actual calibration standard is placed in a data storage in the handheld device 16 or in an at a base reachable by the handheld device 16.

Figure 3:
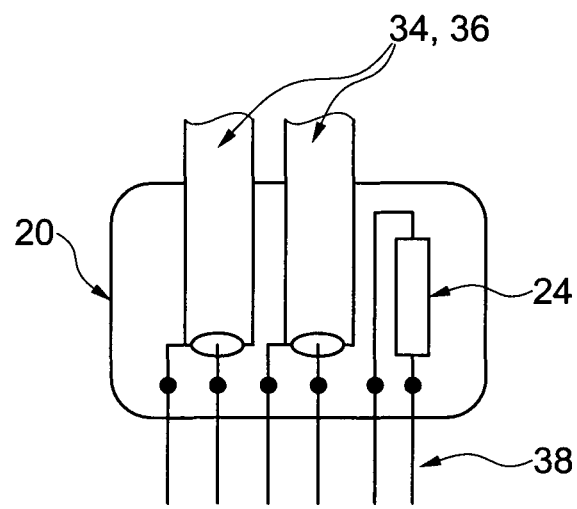
FIG. 3 shows one possible embodiment for a connector.

FIG. 3 shows a connector 20 and indicates that two high frequency signal lines 34, 36 are part of the signal that is transmitted to the connector 20. Further is indicated a resistor 24 and all the lines 34, 36 and resistor 24 are connected through connector legs 38.

In this way, high frequency signals from the two transducers can be directly connected to the handheld device to the legs 38. The resistor 24 can represent the calibration value for the actual device 2. Hereby can the handheld device be calibrated to the actual duct as soon as the high frequency cables are connected to the connector.

Figure 4:
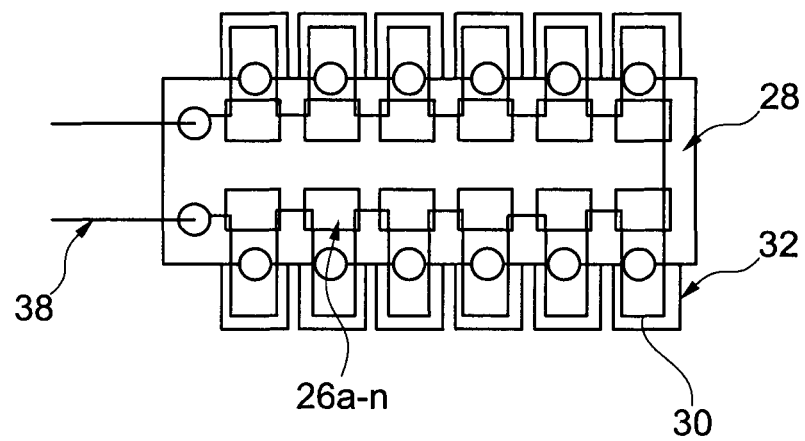
FIG. 4 shows a possible embodiment for a resistor network.

FIG. 4 shows a possible embodiment for the resistor 24. A plurality of resistors is placed on the same printed board forming a serial connection. All resistors 26*a-n* indicated in FIG. 4 are short circuited by a printed wire 30 that is running in pads 32, which are part of the printed circuit board 28. The pads 30 are all weakened in their connection because there is one or more holes drilled between the connecting wires 30. Two connectors 38 are indicated which could be part of the connector 20 indicated at FIG. 3. In operation, the printed board 28, as seen at FIG. 4, will have a very low resistance because all of the resistors are short circuited so the resistance that could be measured is dependent on the resistance of the printed circuit board wires. But, in use, one or more of the pads 30 are to be broken away in order to achieve the resistance value that represents the actual duct.

Figure 5:
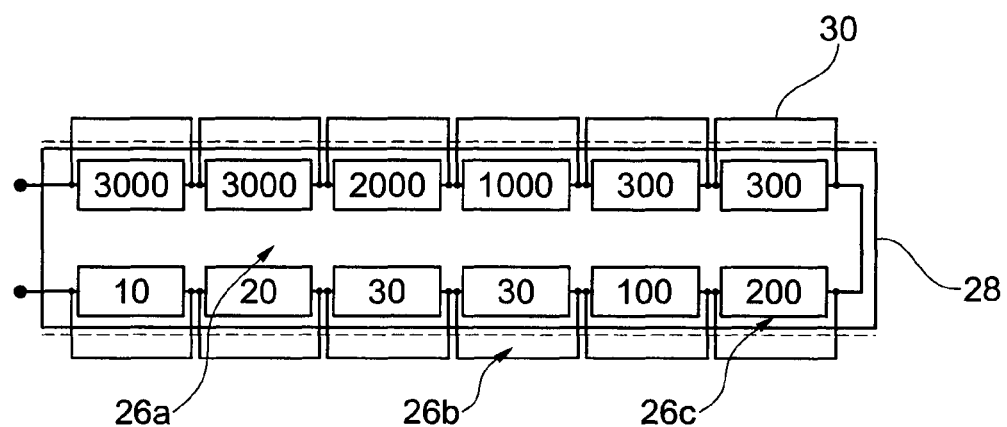
FIG. 5 shows a more detailed disclosure of a resistor network as disclosed at FIG. 4.

FIG. 5 shows a diagram indicating a plurality of resistors 26 *a-n* placed on a printed circuit board 28. It can be seen in FIG. 5 that the resistors have different ohmic values. Further, it is indicated that all the resistors are short circuited by printed wires. The short circuit can be broken away for each of the resistors. The programming of the printed circuit board 28 can be made in a way where, starting with the biggest resistor which is less than the wanted value is broken away. Then, further pads 30 are broken away to adjust closer and closer to the actual value that is desired and every possible value that is used for the calibration is possible by the combination of resistant values indicated at FIG. 5. Imagine that it is desired to reach a resistance at a value at 3.230 ohms. Then, you can start breaking away the pad that activates one of the 3.000 ohm values. After that you can break away the 200 ohms pad ending up with breaking away one of the small pads for 30 ohms. Many of other values are possible to achieve. When the correct resistance is achieved by breaking away the pads, the printed circuit board 28 can be placed in the connector 20 and an indication of the calibration standard for the actual duct is achieved in a very effective and very cheap way.

What is claimed is:

1. System for measuring flow of gas or air, which system comprises a flow duct, which flow duct comprises at least two transducers, which transducers generate at least one beam of ultrasound in the flow duct, which transducers are connected to a transmitter and to a receiver, wherein the transducers are mounted and fixed in relation to the duct, wherein the transmitter is permanently connected to the transducers, wherein the receiver is located in a handheld device, the handheld device communicates with the transmitter, wherein the transmitter comprises to a source of calibration data representing the location of the transducers in the flow duct and the size of the flow duct, which calibration data is communicated by the transmitter to the receiver in the handheld device.

2. System according to claim 1, wherein wireless transmission means is provided for transmission of measured data and calibration information from the transmitter and said source of calibration data to the receiver.

3. System according to claim 2, wherein the source of calibration data is adapted to store the calibration data as a dataset that represents directly or indirectly the calibration data, which calibration data is able to be read by the hand held device by transmission of data representing actual flow in the duct.

4. System according to claim 1, wherein the transmitter is a first part of a connector, wherein the handheld device comprises a second part of the connector, at least the calibration data being transmittable from said source of calibration data by the transmitter to the handheld device as a data segment.

5. System according to claim 4, wherein the transmitter comprises at least one DIL switch, which DIL switch is operatively connected to said source of calibration data that comprises at least a data segment representing the calibration data, which calibration data is transmittable from said a source of calibration data via the DIL switch by the connector to the handheld device.

6. System according to claim 1, wherein the transmitter comprises at least one resistor which comprises said source of calibration data having a resistor value that represents the calibration data for an actual duct, which resistor value is transmittable to the handheld device.

7. System according to claim 6, wherein the at least one resistor comprises a plurality of resistors, which resistors are activated by connecting one or more of the resistors for representing the calibration data.

8. System according to claim 7, wherein a printed board contains said plurality resistors the resistors being connected in series and being short circuited by a conductor at the printed board, which conductor passes a pad, which pad is to be removed for activating the resistor.

9. Method for measuring flow of gas or air by means of a system comprising:
    generating at least one beam of ultrasound in the flow duct using a transmitter permanently connected to at least two transducers mounted and fixed in relation to a duct through which a flow of gas or air passes, and
    communicating at least calibration data representing the location of the transducers in the flow duct and the size of the flow duct from a source of calibration data by the transmitter to a receiver located in a handheld device.

* * * * *